UNITED STATES PATENT OFFICE.

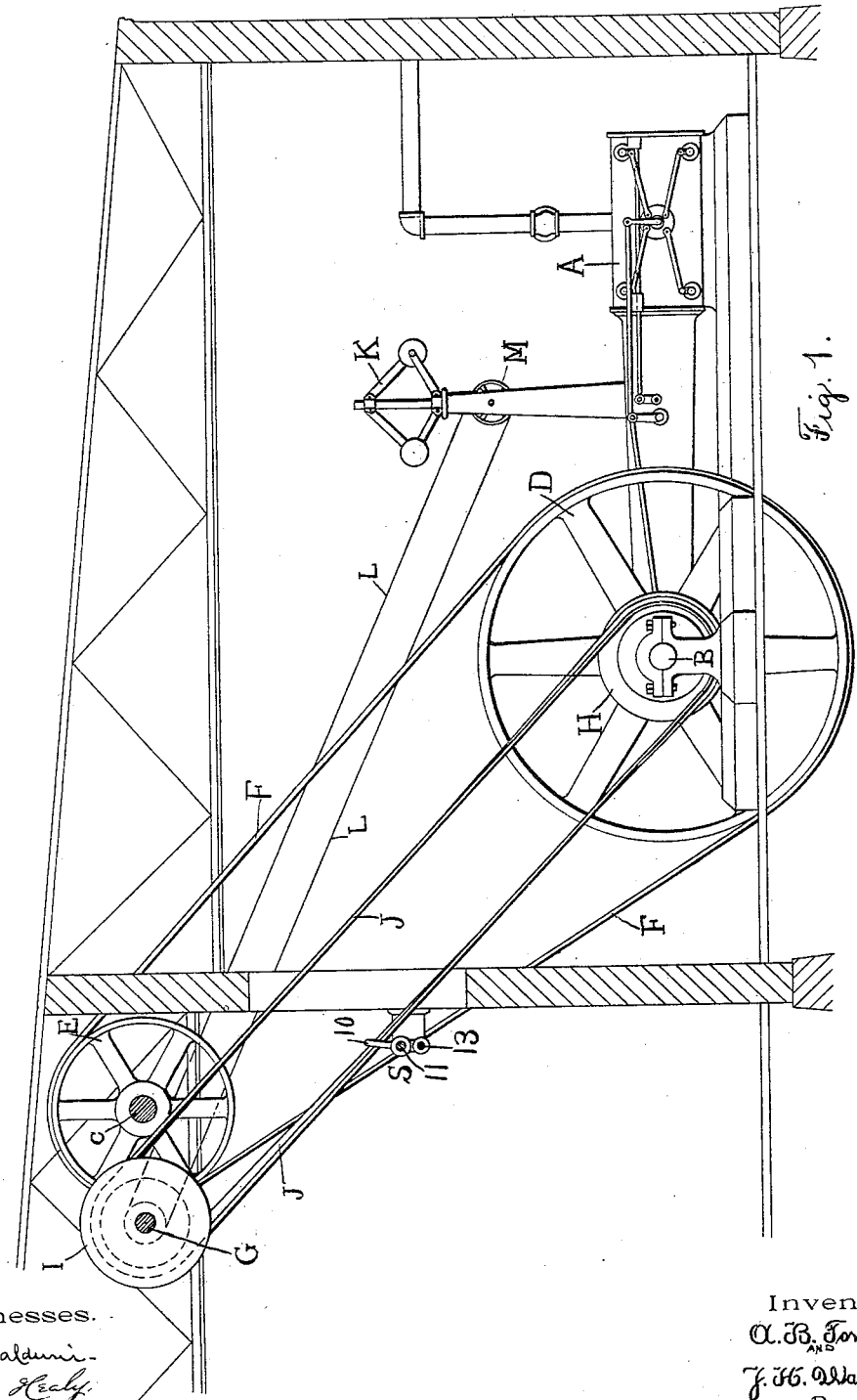

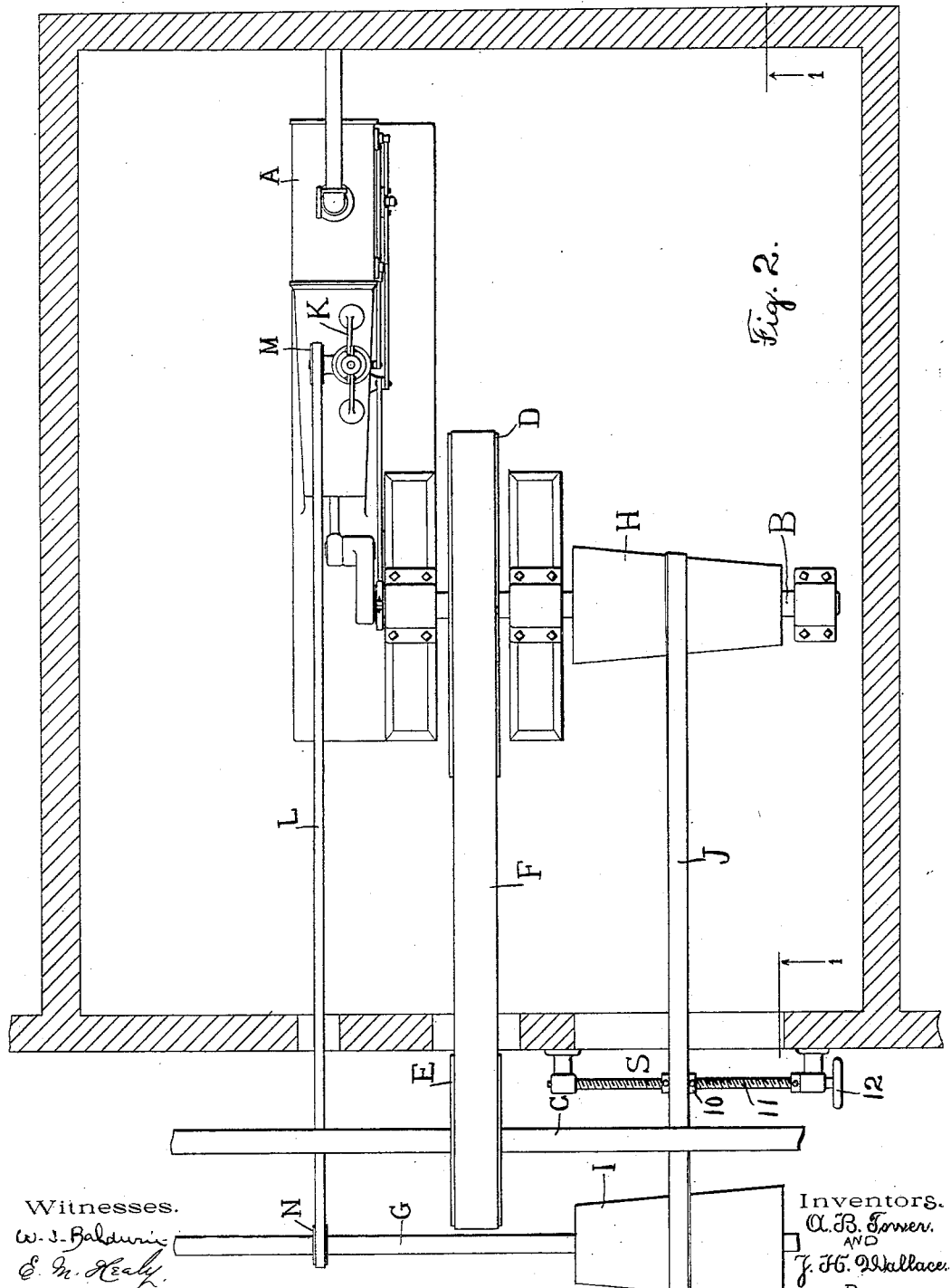

ASHLEY B. TOWER AND JOSEPH H. WALLACE, OF NEW YORK, N. Y., ASSIGNORS TO THE TOWER & WALLACE, OF SAME PLACE.

DRIVING CONNECTION FOR PAPER MACHINERY.

SPECIFICATION forming part of Letters Patent No. 620,619, dated March 7, 1899.

Application filed July 5, 1898. Serial No. 685,094. (No model.)

*To all whom it may concern:*

Be it known that we, ASHLEY B. TOWER and JOSEPH H. WALLACE, citizens of the United States, residing at New York, in the county of New York and State of New York, have invented a new and useful Improvement in Driving Connections for Paper Machinery, of which the following is a specification.
The object of our present invention is to provide a simple, durable, and efficient driving apparatus for paper-making plants or other mills in which certain parts of the machinery have to be driven at a constant speed, while the greater part of the plant or machinery has to be provided with means for driving the same at varying speeds.

To this end our invention consists of the arrangement and combinations of parts, as hereinafter described, and more particularly pointed out in the claims at the end of this specification.

In the accompanying two sheets of drawings, Figure 1 is a diagrammatic sectional view of a driving apparatus constructed according to our invention, and Fig. 2 is a plan view of the same.

In paper-making plants certain parts of the machinery—as, for example, the "shakes," "screens," "stuff-pumps," &c.—should be driven at a substantially constant speed, while the greater part of the machinery of a paper-making plant should be driven at a speed which can be varied to adapt the plant to finish in a given time different amounts of paper, according to the weight or quality which it is desired to produce.

The driving connections for paper-mill plants as heretofore constructed have ordinarily included an engine or other prime motor governed or regulated to run at a constant speed.

The driving connection for operating the machinery of paper-mill plants which is now most widely employed and is generally accepted as embodying the best present practice is known as the "Marshall drive."

The Marshall drive for paper-mill plants and similar classes of machinery comprises an engine or other prime motor which is governed to run at a constant speed, a jack-shaft driven therefrom, a constant-speed shaft which is driven from the jack-shaft and which is employed for driving those parts of the paper-making machinery which are necessarily run at a constant speed, and a variable-speed power-shaft which is employed for driving the principal parts of paper-making machinery and which is driven from the jack-shaft by a change-speed gearing usually comprising a shiftable belt and cone-pulleys.

In a moderate-sized paper-making plant the variable-speed power-shaft will absorb or require in the neighborhood of fifteen or twenty horse power to turn the same, while the variable-speed power-shaft may require as much as a hundred to one hundred and fifty horse power.

In a moderate-sized well-designed paper-making plant using the Marshall drive the constant-speed shaft would be driven by a four-inch belt, while the variable-speed power-shaft would profitably require to be driven by a fourteen to sixteen inch belt; but because of difficulties in adapting large belts to cone-pulleys small belts are necessarily used at a consequent excessive loss in power and short life of belts.

To change the speed of the paper-making plant employing the Marshall drive so as to adapt the same to produce a different quantity or different quality of paper, the cone-driving belt has to be shifted or moved on its cone-pulleys, and in practice it has been found that the life of this belt mounted on cone-pulleys is comparatively short, and in nearly all paper-making plants employing the Marshall drive this belt now has to be frequently renewed or repaired, and in the case of machines running at high rates of speed and requiring approximately two-hundred-horse power it has been necessary to abandon the main cone-driving system, with a consequent disadvantage. Further, a cone for wide speed variation and large power transmission has to be very long between its bearings, and for these reasons a considerable amount of power is lost by the use of cone-pulleys.

The especial objects of our present invention are to provide a driving apparatus for paper-making plants or similar situations which can be more readily adjusted to change the speed at which paper will be produced, which can be more economically operated, and which will not place as heavy a wearing strain on the belts as in the constructions now most widely employed, and to provide a construction in which cone-pulleys for the large belt are eliminated. To this end we employ an engine or other prime motor which instead of being governed so as to run at a constant speed is designed to be economically operated at different speeds, and while our driving connections may be operated from electric motors, water-wheels, or other motive power our driving apparatus can be especially efficiently employed in connection with the ordinary forms of steam-engines.

Where a steam-engine having its governor set to regulate the engine to run at a constant speed is called upon to overcome somewhat widely varying loads, the engine must of necessity take steam for different fractions of its stroke, or, as it is termed, the "point of cut-off" will be changed.

It is well known that to obtain the full expansive power from steam there is a certain point of cut-off which can be most economically employed, and that when the point of cut-off is varied so that the engine takes steam either for a greater or less part of its stroke the efficiency of the engine is reduced.

By changing the speed of an engine the work done or overcome may be varied without changing the point of cut-off.

Any of the well-known makes of steam-engines—such, for example, as the ordinary Corliss types of engines—are sufficiently well built so that their speeds may be sufficiently varied to adapt them to the varying loads of a paper-making plant without interfering with their smooth or economical operation.

A driving apparatus for paper-making plants and similar locations constructed according to our invention comprises a steam-engine or other motor adapted to run at different speeds, a variable-speed power-shaft driven thereby and preferably directly belted or geared thereto, a governor for controlling the motor, a constant-speed shaft connected to the governor, and a change-speed gearing between the motor and the constant-speed shaft. The change-speed gearing between the motor and constant-speed shaft preferably consists of a shiftable belt and cone-pulleys. This shiftable belt may be comparatively light as compared with the belt or other connection necessarily employed for driving the variable-speed shaft. By shifting this comparatively light belt the speed of the variable-speed power-shaft and motor can be adjusted or varied, as desired, to conform to the quality or quantity of the paper which it is desired to produce—that is to say, while the approved driving connections for paper-making plants have heretofore ordinarily employed a constant-speed motor and a constant-speed shaft driven therefrom and have employed a change-gearing between the motor and the variable-speed power-shaft a driving apparatus constructed according to our invention comprises a variable-speed motor which may be directly connected to the variable-speed power-shaft, a constant-speed shaft, and a governor which is driven to turn at a constant speed from the constant-speed shaft when the plant is working properly, and a variable-speed gearing between the motor and constant-speed shaft.

Referring to the drawings and in detail, we have illustrated a driving apparatus employing a steam-engine A, although our driving connections may be operated or driven from a water-wheel or any other well-known motor.

As illustrated, the steam-engine A may be of any of the well-known types—as, for example, the ordinary Corliss type of engine, which need not be herein shown or described at length.

B designates the engine-shaft.

The variable-speed power-shaft C is driven from the engine A preferably by being directly belted to the main shaft B by means of pulleys D and E and driving-belt F.

The constant-speed shaft G is driven from the engine A by a change-speed gearing which preferably comprises cone-pulleys H and I and a shiftable belt J.

The belt J can be shifted to different relative positions on its cone-pulleys H and I by any of the ordinary belt-shifting constructions—as, for example, by the belt-shifter S.

The belt-shifter S, as illustrated, comprises a belt-fork 10, which can be adjusted back and forth by a lead-screw 11. The lead-screw 11 is provided with an operating wheel or handle 12, and the belt-fork 10 is held from turning by a guide-rod 13.

The governor for controlling the engine is designated by the reference-letter K, and instead of driving or operating the governor by direct connections from the main shaft of the engine, as in engines which are regulated to run at a constant speed, the governor K is driven from the constant-speed shaft G preferably by means of pulleys M and N and a belt L.

The governor K is preferably adjusted so that when the constant-speed shaft G and said governor are turning at their normal speeds the steam-supply of the engine A will be regulated to cut off at the most economical point of cut-off which secures the greatest degree of efficiency.

In the normal operation of a driving apparatus constructed according to our invention the constant-speed shaft G and governor K will turn at a normal or fixed speed independently of the adjustment of the speed of the engine A and the variable-speed power-shaft C.

When it is desired to regulate paper-making machinery actuated by a driving apparatus constructed according to our invention to operate faster to produce a larger amount of paper—as, for example, when it is desired to employ lighter grades of stock—it is simply necessary to move the shiftable belt J onto a larger section of the cone-pulley I. This will change the relation of the speed of the constant-speed shaft and governor to the variable-speed power-shaft and motor, and the motor and variable-speed power-shaft will have to run at a faster speed, depending upon the amount of adjustment to maintain the constant-speed shaft, and thereby the governor, at its normal or fixed speed.

When it is desired to regulate paper-making machinery to operate at a slower speed to produce a smaller amount of paper—as, for example, when it is desired to employ heavier grades of stock—it is simply necessary to move the shiftable belt in the other direction or onto a smaller section of the cone-pulley I. This will change the relation of the speed of the constant-speed shaft to the variable-speed power-shaft and motor, so that the motor and variable-speed power-shaft will have to turn at a slower speed to maintain the constant-speed shaft, and thereby the governor, at the normal or fixed speed.

We are aware that many changes may be made in our driving apparatus by those who are skilled in the art, that it is not essential to employ a steam-engine in connection with our invention, as the same may be well practiced as applied to govern a water-wheel or similar motor, and that our driving apparatus may in some instances be used to advantage for other purposes besides the operation of paper-making plants.

In some cases we contemplate putting the cone H on the shaft C or on some other shaft driven from the motor, the only requisite of our invention being that there shall be a change-speed gearing in the connections between the constant-speed shaft G and the motor.

The cones H and I may be made in the usual form of step-cones and the belt-shifter omitted, so that the belt J can be shifted by hand, if so desired, and of course many other forms of change-gearing may be used instead of the specific form we have illustrated without departing from the scope of our invention. We do not wish, therefore, to be limited to the form which we have shown and described; but What we do claim, and desire to secure by Letters Patent of the United States, is—

1. In a driving apparatus for the purposes stated, the combination of a motor adapted to run at different speeds, a variable-speed power-shaft driven thereby, a governor for the motor, a constant-speed shaft connected thereto, and a change-speed gearing between the motor and the constant-speed shaft, substantially as described.

2. In a driving apparatus for the purposes stated, the combination of a motor adapted to run at different speeds, a variable-speed power-shaft driven thereby, a governor for the motor, a constant-speed shaft connected thereto, and a shiftable belt and cone-pulleys forming a change-speed gearing between the motor and the constant-speed shaft, substantially as described.

3. In a driving apparatus for the purposes stated, the combination of a steam-engine adapted to run at different speeds, a variable-speed power-shaft driven thereby, a governor for the steam-engine, a constant-speed shaft connected thereto, and a change-speed gearing between the steam-engine and the constant-speed shaft, substantially as described.

4. In a driving apparatus for the purposes stated, the combination of a steam-engine adapted to run at different speeds, a variable-speed power-shaft driven thereby, a governor for the steam-engine, a constant-speed shaft connected thereto, and a shiftable belt and cone-pulleys forming a change-speed gearing between the steam-engine and the constant-speed shaft, substantially as described.

5. In a driving apparatus for paper-making machinery, the combination of a steam-engine A adapted to run at different speeds, a variable-speed power-shaft C for driving the rolls of a paper-making plant, pulleys D and E, and belt F for driving the variable-speed power-shaft C from the main shaft B of the engine, a constant-speed shaft G for driving subsidiary parts of a paper-making plant, a governor K for the steam-engine, pulleys M and N, and belt L for driving the governor from the shaft G, and shiftable belt J, and cone-pulleys H and I forming a change-speed gearing between the main shaft B of the engine and the constant-speed shaft G, substantially as described.

In testimony whereof we have hereunto set our hands in the presence of two subscribing witnesses.

ASHLEY B. TOWER.
    JOSEPH H. WALLACE.

Witnesses:
 V. BIGELOW,
 E. E. SIEBENS.